Aug. 13, 1968     J. CADIOU     3,396,984
ANTI-ROLL DEVICES FOR AUTOMATIC VEHICLES
Filed July 20, 1966     3 Sheets-Sheet 1

Aug. 13, 1968     J. CADIOU     3,396,984
ANTI-ROLL DEVICES FOR AUTOMATIC VEHICLES
Filed July 20, 1966     3 Sheets-Sheet 2
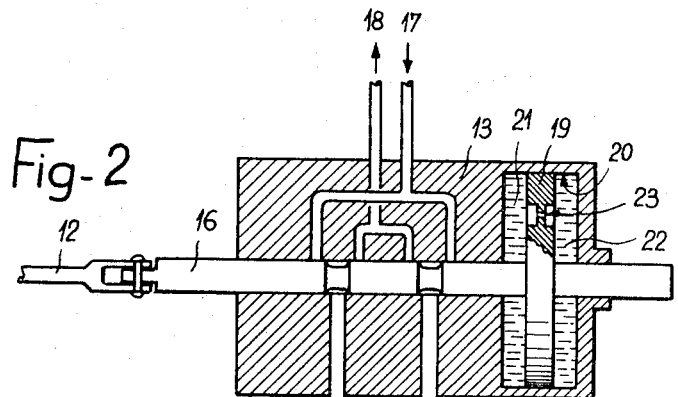
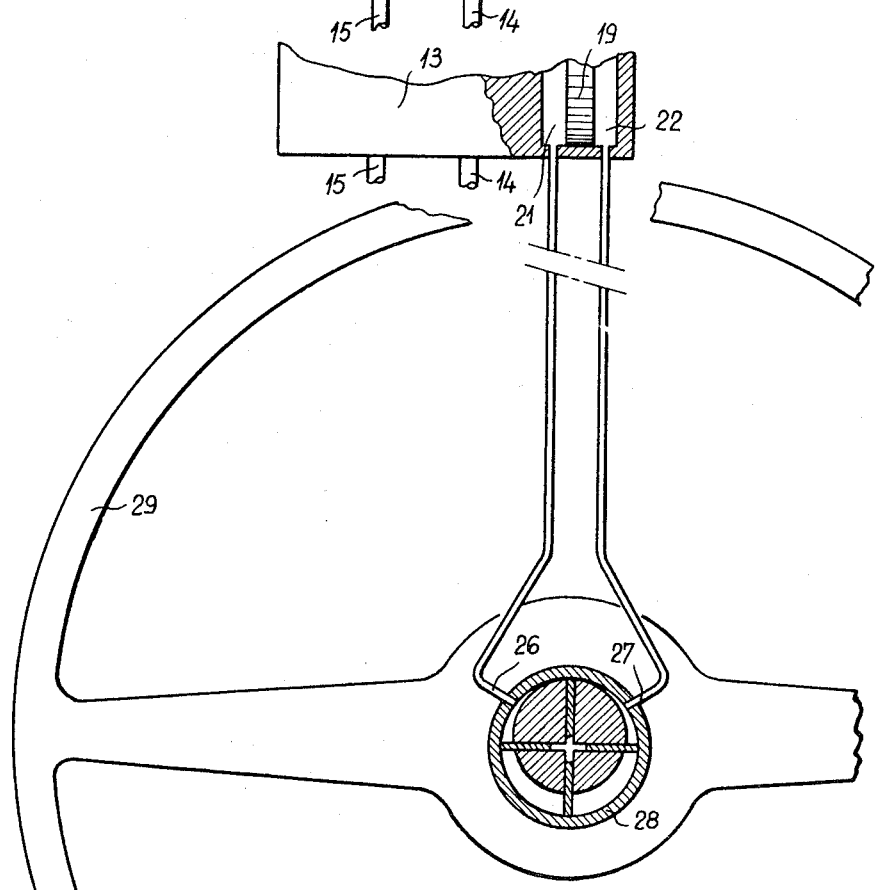

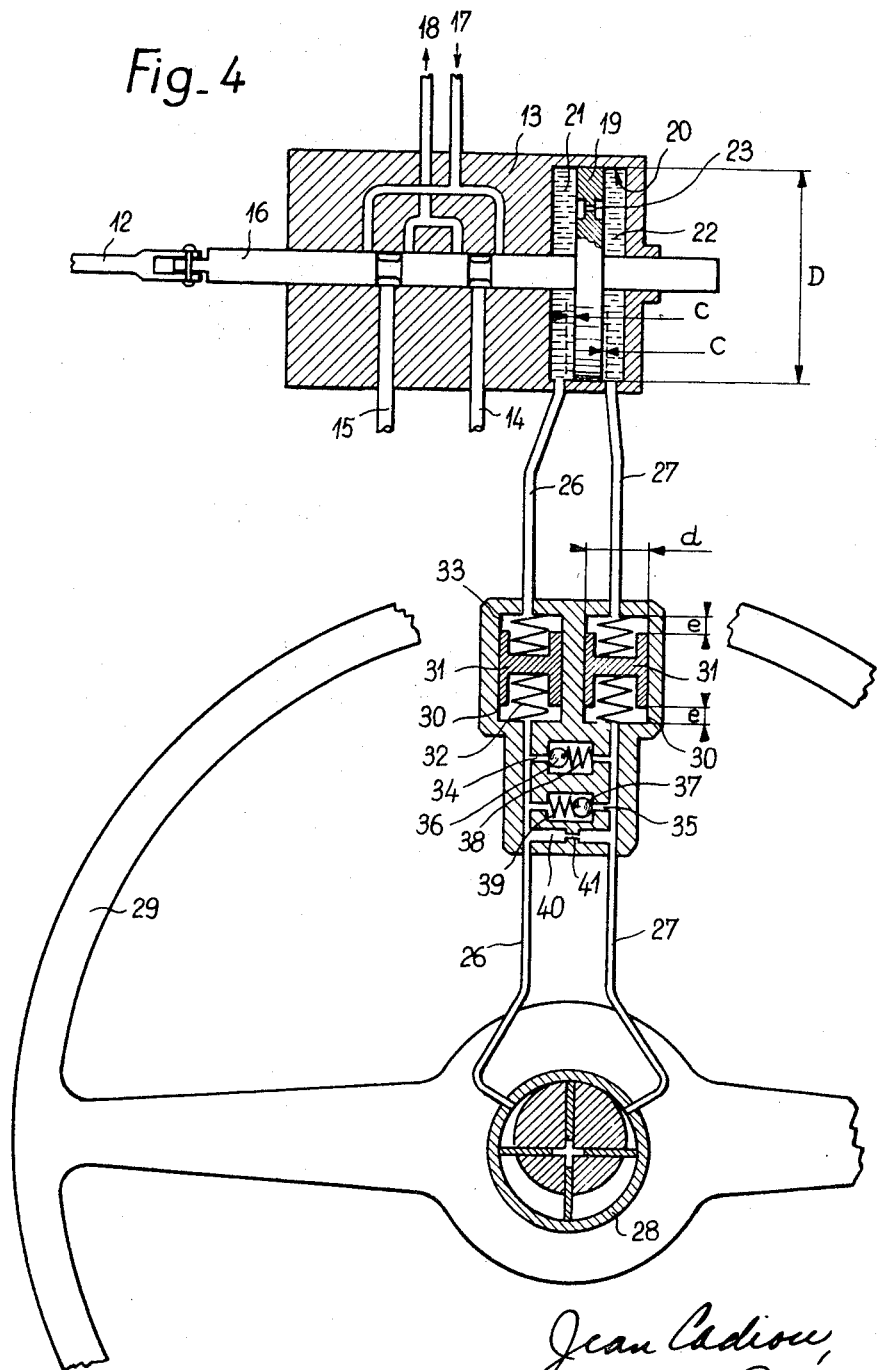

United States Patent Office 3,396,984
Patented Aug. 13, 1968

3,396,984
ANTI-ROLL DEVICES FOR AUTOMATIC
VEHICLES
Jean Cadiou, Paris, France, assignor to Societe Anonyme
Andre Citroen, Paris, France, a French corporation
Filed July 20, 1966, Ser. No. 566,499
Claims priority, application France, Aug. 3, 1965,
27,080; Jan. 24, 1966, 46,956
6 Claims. (Cl. 280—6)

ABSTRACT OF THE DISCLOSURE

An anti-roll device for an automotive vehicle for inclining the body of the vehicle inwardly of a turn having at least one anti-roll bar connected to the wheel carrier arms through means responsive to a distributor. Two rods are supported by the vehicle body and a rudder bar connected to the distributor is mounted on the rods. Resilient means connect the ends of one of the rods to the wheel carrier arms and resilient means connect the ends of the other rod to the anti-roll bar. The rudder when actuated by the rods operates the distributor to control the delivery of fluid under pressure to the means responsive to the distributor to the extent necessary and sufficient to impart to the vehicle body an inclination proportional to the angle of the torsional deflection impressed on the anti-roll bar and such inclination is directed inwardly of the turn. Time-lag means are associated with the distributor responsive to movements of steering mechanism.

---

It is conventional in automotive vehicles to provide so-called "stabilizing" torsion bars for limiting the lateral inclination of the vehicle on curves, in case of insufficiency of the suspension system, or even for completely counteracting the reaction torque if the suspension system is not designed for this purpose.

In frequent cases more or less screwed telescopic links are provided for mounting and adjusting these bars, in order properly to adjust the parallelism of the vehicle frame with respect to the ground. On the other hand, it is known to adjust the position of the reaction point of the suspension springs by means of a cylinder and piston actuator with a view to keep the vehicle at a constant height above the ground, as set forth in the applicant's French Patent No. 947,124, dated June 5, 1946.

The same solution is also applicable to torsion bars by substituting servo-action hydraulic cylinders for the telescopic links, to avoid the lateral inclination of the vehicle on curves and even permit its inclination towards the centre of the curve. In those cases where the stabilizing bar is not connected to the link-controlled axle movement, torsion adjustment cylinders have also been provided for the same purpose (for example as proposed in the applicant's German Patent No. 745,155, dated Sept. 10, 1937).

Although it was not difficult to bring a solution of this character to the problem of compensating the rolling inclination caused by cornering, it was much more difficult to find simple and economical means for obtaining a complete automation while meeting all the other operating requirements.

The angle of torsion of a stabilizing bar is proportional to the centrifugal force acting upon the vehicle. If this angle is zero, the vehicle must be parallel to the ground. It is relatively easy to provide servo means for controlling the stabilizing bar or bars to preserve the parallelism irrespective of the centrifugal force by utilizing a hydraulic distributor controlled by means similar to those disclosed in the applicant's French Patent No. 1,096,561, dated Feb. 21, 1953.

This solution would not be sufficient, for it is advantageous to obtain the vehicle inclination inwardly of the turn being negotiated, from the dual point of view of the passengers' comfort and of the road holding properties of the vehicle when turning.

This aim was sought by many inventors but the solutions proposed so far, even though they provide satisfactory results, are not applicable in practice or on a large scale due to their complexity.

This problem is solved in a simple and therefore very economical manner by the present invention.

It is known that the angle of torsion of the stabilizing bar is subordinate to the rolling torque to be counteracted thereby. Of course, this angular movement is independent of the adjustment of the hydraulic cylinders connecting this bar to the wheel carrier arms. The purpose is to incline the vehicle inwardly of the turn. It is logical to desire that this inward inclination be proportional to the centrifugal force, that is, to the rolling torque, and therefore to the angular deflection of the stabilizing bar. Therefore, the hydraulic cylinder or cylinders associated with this stabilizing bar must be so controlled that the angle of inclination of the vehicle towards the centre of the turn be proportional to the angle of torsional deflection of said bar. Now it is possible to measure on the one hand the angle and direction of the torsional deflection applied to the stabilizing bar, and on the other hand the angle and direction of the vehicle inclination. A comparison between these two measurements permits of servo-controlling the hydraulic cylinders with a view to provide the desired result.

The arrangement may be represented diagrammatically by measuring the angles and converting their values into electrical voltages, the position of the servo-control means being stabilized when equal and oppositely directed voltages are obtained.

Due to the efforts involved or available in an automotive suspension system it is not necessary to resort to electrical voltages, a considerably simpler proposition consisting in utilizing elastic "tensions" by combining spring means as already proposed, for example in the applicant's French Patents No. 1,003,175 of Dec. 13, 1946, No. 1,096,561 of Dec. 21, 1953, and U.S. Patent No. 3,194,581 of Mar. 13, 1963.

It is therefore the essential object of this invention to provide an anti-roll device for automotive vehicles, whereby the body of the vehicle can be inclined inwardly of a turn, this vehicle being equipped with at least one anti-roll bar connected to the wheel carrier arms by means of hydraulic or pneumatic torsion cylinders responsive to a distributor, this device being characterized by a specific arrangement comprising two rods and a rudder bar, which is supported by the body, the rod ends being connected through resilient means to the wheel carrier arms in the case of one rod and to the ends of the torsion bar in the case of the other rod, the rudder bar actuated by said rods being connected to said distributor for controlling the delivery of the quantity of fluid under pressure to said cylinders which is necessary for producing a body inclination proportional to the torsional deflection of the torsion bar, inwardly of the turn being negotiated.

This invention is also concerned, in combination with a device of the type broadly set forth hereinabove, with a time-lag system capable of deferring the operation of said device in case of short-time changes in the vehicle trim, this system also comprising actuator means controlled by the steering mechanism of the vehicle for reducing this time-lag action.

In a first preferred form of embodiment of this invention a pump driven by the steering wheel or mechanism constitutes a by-pass for a hydraulic resistance provided in a piston disposed at one end of the distributor slide valve. The cubic capacity of this pump must be carefully calculated to avoid notably the creation of an additional force acting upon this slide valve.

However, in practice it appeared not only that this arrangement made it difficult to obtain a satisfactory adjustment, but also that it was preferable to suppress the time-lag upon each reversal of the movement of the steering wheel, but only during the beginning of this movement.

An improved arrangement of this character affords the desired result and consists in inserting, into the fluid circuit two pipe lines connecting the steering-wheel driven pump to the time-lag piston rigid with the distributor, a valve and piston device so arranged that a spring-compensated piston lies in each one of said pipe lines, and that said pipe lines are interconnected by a pair of ball valves loaded in opposite directions by calibrated springs, whereby after said pistons have been moved in opposite directions by the pump pressure to suppress the time-lag effect the opening of one of these spring-loaded valves will either connect this pump to the circuit, or by-pass same, thus restoring at that time the time-lag of the distributor piston.

This specific feature as well as other features and advantages characterising this invention will appear as the following description proceeds with reference to the accompanying drawing illustrating diagrammatically by way of example typical forms of embodiment of this invention. In the drawing:

FIGURE 2 is a sectional view of the distributor;

FIGURE 3 is a diagrammatic view showing the manner in which the steering mechanism controls the time-lag system incorporated in the distributor; and FIGURE 4 is a diagram showing an improved arrangement of the circuit connecting the steering-wheel driven pump to the distributor.

Figure 1:
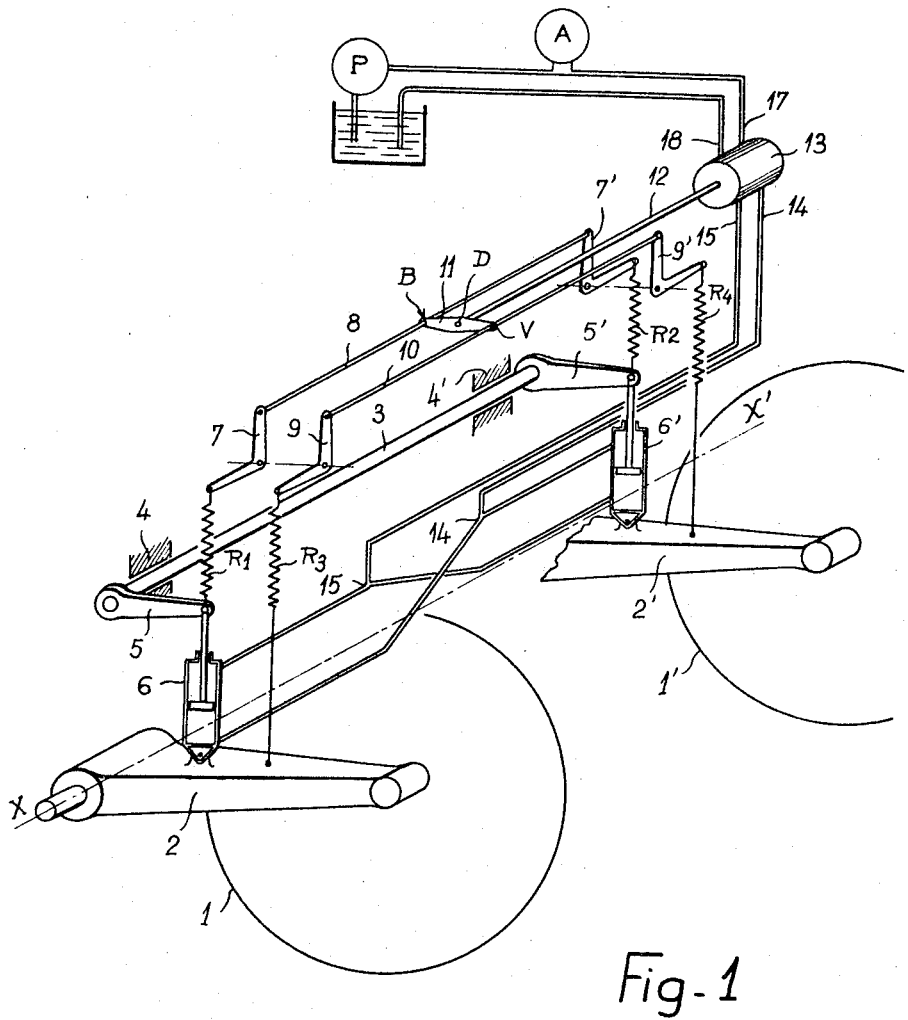
FIGURE 1 is a diagrammatic illustration of a device according to this invention as applied to an axle of an automotive vehicle.

Referring first to FIGURE 1, the device is shown therein as applied to a single axle of the automotive vehicle, but it is clear that the same device could be associated without difficulty with the wheels of the other axle, if desired. This axle may be of any desired type. In this example it comprises two road wheels 1 and 1' (FIGURE 1) connected by carrier arms 2 and 2' to the body or frame (not shown) of the vehicle. These arms are pivoted about an axis X–X' perpendicular to the longitudinal median plane of the vehicle, but it would not constitute a departure from the general principle of the arrangement to mount these arms for pivoting about axes parallel, or even oblique in relation, to this plane. Besides, this system is also applicable to a rigid axle.

The suspension system proper of the vehicle is not shown for its specific structure is immaterial for the purpose of this invention. Thus, coil springs, leaf springs, torsion bars, hydro-pneumatic or pneumatic suspension systems may be used.

A stabilizing bar 3 freely pivoted on a pair of bearings 4 and 4' rigid with the vehicle frame is connected to the wheel carrier arms 2 and 2' through the medium of levers 5 and 5', and also telescopic cylinders 6 and 6'.

The levers 5 and 5' are interconnected by springs R1 and R2, bell crank levers 7 and 7' fulcrumed on the frame of the vehicle and a coupling rod 8.

Similarly, the suspension arms 2 and 2' (or two opposite points of a rigid axle) are interconnected by springs R3 and R4, bell crank levers 9 and 9' fulcrumed on the frame, and a coupling rod 10. The middle point B of rod 8 and the middle point V of rod 10 are interconnected by a rudder bar 11. One intermediate point D of this rudder bar 11 is connected through a rod 12 to the slide valve of a fluid distributor 13. This distributor 13 is connected in turn through a pipe line 17 to a source of fluid under pressure consisting of a pump P and an accumulator A, and also through a pipe line 18 to the fluid reservoir, and on the other and through pipe lines 14 and 15 to cylinder and piston actuators 6 and 6', one pipe line 14 communicating with the lower chamber of cylinder 6 and the upper chamber of cylinder 6', the other pipe line 15 communicating conversely with the lower chamber of cylinder 6' and the upper chamber of cylinder 6.

The distributor 13 (see FIGURE 2) comprises as conventional a slide valve 16 which, when moved to its right-hand endmost position, connects pressure-fluid inlet to the pipe line 14 and the return line 18 to line 15, and vice versa when the slide valve is pulled home in the left-hand direction. The slide valve is responsive to the rod 12 attached to the rudder bar 11 at the intermediate point D thereof.

The distributor 13 comprises a time-lag device illustrated diagrammatically in the form of a piston 19 rigid with the slide valve 16. This piston is slidably mounted in a cylinder 20 and divides the cylinder 20 into two chambers 21 and 22. The fluid communication between the two chambers is through a gaged throttling orifice 23. The cylinder 20 is filled with liquid so that the movement of slide valve 16 is retarded by the throttling of this liquid through the jet 23. The purpose of this time-lag device is to prevent the system from operating when the frequency of wheel beats exceeds a certain value. The purpose of this time-lag device is the same as that of the automatic vertical adjustment device incorporated in "Citroen" hydro-pneumatic suspension systems, which device is prevented from operating at each wheel beat. Therefore the system of this invention may be constructed as illustrated and described in the applicant's French Patents No. 1,094,986 of Nov. 30, 1953, No. 1,210,681 of Apr. 10, 1958, and its addition No. 78,705 of Nov. 18, 1960.

The device is illustrated as applied to a single axle of the vehicle. However, in modern vehicles it is preferable to act on both axles.

This result can be achieved by simply equipping the other axle with a stabilizing bar provided with adjustment cylinders and properly connecting these cylinders to the aforesaid cylinders 6 and 6'. A second servo-control system is definitely unnecessary. This cylinder assembly associated with the wheel carrier arms, which is capable of perfectly and reliably compensating the anti-roll torques of each axle in a predetermined relationship, irrespective of the ground or road unevennesses, has already been described in the aforesaid U.S. Patent No. 3,194,581.

The device operates as follows:

Assuming that the distributor 13 is in its neutral position, intermediate point D of the rudder-bar occupies a well-defined position on the frame of the vehicle. Besides, when the stabilizing bar is in its zero-torsion or unstressed position, the point B has a well-defined position on the frame, and moves either to the left or to the right, according as the centrifugal force is directed to the right or to the left, the length of this movement being proportional to the centrifugal force. In fact, if the vehicle body banks on the side tending to move the bearing 4 towards the arm 2, without acting upon the cylinder 6, the outer end of arm 5 remains at the same relative height above the ground, but the rod 8 supported by the vehicle body will also be inclined, thus easing the spring R1 and for the opposite reason the spring R2 will be tensioned to a greater degree, thus bringing about a movement of translation of said rod 8 and therefore of the point B to a certain extent towards the bell crank lever 7'.

The relative vertical movement of both wheels with respect to each other is measured at point V, this point V moving to the right when the vehicle is leaning to the left and inversely, its position being subordinate to the angle of inclination.

Assuming that the vehicle is cornering on a cantless turn, with the arm 2' on the inner side and the other arm 2 on the outer side of the turn, the centrifugal force will incline the vehicle toward the arm 2, the aforesaid point B moving to the right together with the point V; as the rudder bar 11 is carried along the rod 12 will actuate the distributor 13 in the direction to deliver fluid under pressure to the lower chamber of cylinder 6 and to the upper chamber of cylinder 6', the other sides of these cylinders being connected to the exhaust. As a result, the vehicle body will move towards the arm 2' and as contrasted thereto away from the other arm 2, thus inclining the vehicle body in a direction opposite to the direction in which said centrifugal force is exerted.

As the centrifugal force keeps urging the vehicle outwardly of the corner, the bar 3 is kept in its twisted condition so that point B remains on the right-hand side of its initial position while point V following the relative displacement of arms 2 and 2' moves to the left until a position is reached whereat the rudder bar restores the point D to its initial position in which the distributor is closed.

At the end of the turn the centrifugal force decreases and point B resumes its initial position, the distributor opening in the reverse direction to restore the cylinders and also the aforesaid point V to their initial condition. Of course, this movement takes place gradually when the centrifugal force becomes effective, so that the passengers of the vehicle desirably feel only the inward inclination of the vehicle body, as contemplated.

Referring to the "tension" or effort, it may be written that the effort B equals the algebraic sum of $R1+R2$. that the effort at V is equal to the algebraic sum of $R3+R4$, and that therefore the effort at D is proportional to the algebraic difference of the efforts measured at B and V, the state of equilibrium being obtained when this force is zero. With the apparatus as designed herein it will be seen that this state of equilibrium is obtained when the inclination of the turning vehicle has attained a certain value proportional to the angular torsion of the stabilizing bar, this inclination being opposite to that normally produced by the centrifugal force. The ratio of the value of this inclination and the centrifugal force may be determined by construction beforehand, by properly combining the ratios of all the levers, the force of springs R1, R2, R3 and R4, and more particularly the position of point D along the rudder bar 11 which can easily be adjusted.

The anti-roll device as described hereinabove is self-sufficient, provided that the various parameters are properly selected, notably the time-lag device.

In fact, when driving along a straight but rough-surfaced road, it is preferable to introduce a considerable time-lag in the distributor operation. On the other hand, in the case of sharp turns this time-lag may prove detrimental. This problem can be solved by suppressing or reducing the magnitude of the time-lag when the steering mechanism of the vehicle is being actuated. This improved arrangement is described hereinafter.

The chambers 21 and 22 of distributor 13 are connected respectively to ports 26 and 27 of a pump 28 shown herein in the form of a rotary pump with guided vanes, although any other suitable pump type may be used for this purpose. This pump is driven when the steering wheel 29 is actuated in either direction. Therefore, this pump may be either secured directly to the end of the steering shaft or driven through a counter-motion. When no movement is imparted to the steering wheel, no flows takes place through the medium of pump 28 between chambers 21 and 22, the only passage available therefor being through the throttling jet 23 which may be gaged to provide a considerable time-lag.

Between the neutral position of slide valve 16 and the beginning of the hydraulic circuit switching action, in one or the other direction, a certain free movement is allowed in one or the other direction (of the order of .04") and, considering the surface area of time-lag piston 19, this corresponds to a certain volume of liquid to be transferred from one chamber to the other chamber (21–22). Assuming that this surface area is 20 cc., the volume to be transferred is 2 cc. If the whole of this liquid flows through the jet 23, the slide valve movement is retarded but during an angular movement of the steering wheel 29 a more or less important volume of liquid flows from to the other chamber through the medium of said pump 28, which amounts to reducing or suppressing the retarding effect applied to the slide valve movement. Therefore, the cubic capacity of the pump must be carefully calculated; it must not be too great for if the output exceeded an adequate value an additional force would be created and applied to the slide valve, which is definitely undesirable in the system contemplated herein.

It may also be noted that even during the movement of the steering wheel the damping of the rapid beats caused by road unevennesses remains unchanged.

The diagram of FIGURE 4 is similar to the diagram of FIGURE 2.

Between the distributor 13 and the pump 28 and in the pipe lines 26 and 27, a valve and piston device is interposed. This device comprises two cylinders 30 having slidably mounted therein pistons 31 dividing each cylinder into two compartments connected the one to the distributor and the other to the pump by means of pipe lines 26 and 27, respectively.

This device also comprises valve means in the form of balls 36 and 37 normally seated by calibrated springs 38 and 39 and adapted to provide a communication between the sections of pipe lines 26 and 27 which are on the pump side with respect to said pistons 31.

Finally, a passage 40 having a throttling orifice or jet 41 therein is provided.

In order efficiently to delay the movement of slide valve 16 the latter must be allowed a certain free motion on either side of its neutral position without causing any one of circuits 14 or 15 to communicate with the input or output lines 17 or 18. Assuming that C is the half-stroke in one or the other direction, and given the diameter D of the time-lag piston, the product $DC$ will give the volume of liquid to be transferred from one chamber to the other chamber (21–22) for reducing the response time of the anti-roll servo-action system.

This transfer must involve a limited volume and should not be continued if the driver keeps turning the steering wheel in the same direction, save if this movement is discontinuous.

This result may be obtained by inserting in each circuit section 26, 27, as already mentioned, cylinders 30 having pistons 31 slidably fitted therein, these pistons being held in their mid-stroke position by antagonistic springs 32 and 33 when the steering wheel is stationary.

On either side of their position of equilibrium, the permissible stroke of these pistons 31 is $e$; the value $e$ and the diameter $d$ of pistons 31 are calculated to have the product $de$ at least equal to $DC$.

According to the direction in which the steering wheel is turned, the output of pump 28 will be directed from line 26 to line 27, or vice versa, through ducts 34 or 35 each provided with a ball valve 36 or 37 loaded by a calibrated spring 38 or 39, so that even if the wheel is turned through an angle of relatively small amplitude the difference in pressure between 26 and 27 (or 27 and 26) will be sufficient to move the pistons 31 in the proper direction.

The complete movement of pistons 31 being obtained, the whole of the output delivered by the pump 28 flows through the valve 36 or 37 as long as the rotation of the steering wheel is continued. Reversing the direction of rotation of the steering wheel will move the pistons 31 in the opposite direction until they abut against the end wall of their cylinders.

If, during a turn the steering wheel is stopped, the pistons 31 urged by springs 32 and 33 will slowly resume their inoperative half-way position, the volume of liquid being compensated either by the functional clearance between the pistons 31 and their cylinders 30, or by interconnecting the pipe lines 26 and 27 through a very narrow jet 41 or a plurality of serially disposed jets.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Anti-roll device for an automotive vehicle capable of inclining the body of the vehicle inwardly of a turn having at least one anti-roll bar connected to the wheel carrier arms through means responsive to a distributor comprising two rods supported by the vehicle body, a rudder bar connected to said distributor mounted on said rods, resilient means connecting the ends of one of said rods to said wheel carrier arms, resilient means connecting the ends of the other rod to said anti-roll bar, said rudder when actuated by said rods operating said distributor to control the delivery of fluid under pressure to said means responsive to said distributor to the extent necessary and sufficient to impart to said body an inclination proportional to the angle of the torsional deflection impressed to said anti-roll bar, said inclination being directed inwardly of the turn.

2. A device according to claim 1 wherein time-lag means are associated with said distributor for preventing unnecessary operation of the device in case of short modifications of the vehicle trim.

3. A device according to claim 2, wherein said time-lag means are responsive to means driven from the steering mechanism of the vehicle for reducing the action of said time-lag means as a function of the angle through which said steering mechanism is rotated.

4. An anti-roll device according to claim 2 wherein said time-lag means comprises means preventing the operation of the device in case of minor modifications in the vehicle trim, and means for reducing the time-lag controlled by the steering mechanism of the vehicle.

5. A device as set forth in claim 2 wherein said distributor has a slide valve and said time-lag means comprises a piston fixed to one end of said slide valve having a gaged throttling orifice, said piston being slidably mounted in a chamber filled with liquid and being controlled by the steering mechanism.

6. An anti-roll device as set forth in claim 5 wherein said time-lag means comprises a pump driven by the steering wheel, a pair of pipe lines connecting said pump to said time-lag piston, a valve and piston device in said pipe lines, said pistons in said pipe lines being balanced by a pair of antagonistic springs located in each pipe line, passages interconnecting said pipe lines and a pair of valves urged by calibrated springs in opposite directions controlling said passages whereby when said pistons in said pipe lines have been moved in opposite directions by the pressure of said pump to suppress the time-lag the opening of one of said valves will connect the pump to restore the time-lag effect of said distributor slide-valve.

References Cited

UNITED STATES PATENTS

| | | | |
|---|---|---|---|
| 3,194,581 | 7/1965 | Brueder | 280—112.1 |
| 3,089,710 | 5/1963 | Fiala | 280—112.1 |
| 2,941,815 | 6/1960 | Muller | 280—112.1 |
| 3,197,233 | 7/1965 | Van Winsen | 280—6.11 |

PHILIP GOODMAN, *Primary Examiner.*